June 14, 1966   R. N. HARDY   3,255,886
INERTIAL AIR CONCENTRATING PROCESS AND APPARATUS
Filed Jan. 23, 1961   7 Sheets-Sheet 1

Fig. 1

INVENTOR.
Robert N. Hardy
BY

June 14, 1966 R. N. HARDY 3,255,886
INERTIAL AIR CONCENTRATING PROCESS AND APPARATUS
Filed Jan. 23, 1961 7 Sheets-Sheet 6

Fig. 6

INVENTOR.
Robert N. Hardy
BY

June 14, 1966  R. N. HARDY  3,255,886
INERTIAL AIR CONCENTRATING PROCESS AND APPARATUS
Filed Jan. 23, 1961  7 Sheets-Sheet 7

Fig. 7

INVENTOR.
Robert N. Hardy
BY

United States Patent Office 3,255,886
Patented June 14, 1966

3,255,886
INERTIAL AIR CONCENTRATING PROCESS AND APPARATUS
Robert N. Hardy, Colorado Springs, Colo., assignor, by mesne assignments, to International Con-Sep, Inc., a corporation of Michigan
Filed Jan. 23, 1961, Ser. No. 84,293
11 Claims. (Cl. 209—475)

This application is a continuation-in-part of my co-pending application entitled, "Inertial Air Concentrating Process," Serial Number 28,152, filed May 10, 1960, now abandoned This invention relates to the separation and concentration of particles having like specific gravities from an aggregate containing such particles. More specifically, this invention concerns a new and useful process and novel apparatus for the dry separation of designated heavy mineral substance from the surrounding and inter-mixed silicates and/or other low quality substance.

*The prior art*

Generally speaking, processes of the prior art, such as gold panning, which have for their purpose the collection or concentration of certain sought after minerals, have always been attended by certain disadvantages and inefficiencies. Gold panning is probably the most elemental and at the same time the most widely known process of this nature and is mentioned herein merely as an example of the characteristic type of process involved, the processes themselves, and the apparatus necessary to carry them out.

Common in the prior art of separating apparatus is the launder or sluice box, having a series of grooves or interstices to catch and retain mineral particles in middling or tailing form as they are washed over the riffle grooves. This process inherently involves the use of large quantities of running water and is at best one of low efficiency, collecting only the high grade matter. The same basic process has been used in connection with large tables having riffles over which the water-suspended particles are directed. The tables are further equipped with vibrators (which are cumbersome, large and tedious to operate) which seek to improve the efficiency of the collection and retention of the heavier minerals, the theory being that in the process of vibration the heavier, more valuable minerals will collect at the bottom of the aggregate and riffles will thus be more effective in trapping the minerals. Although more effective than the ordinary sluice, this process is also inefficient and results in merely "high grading" the material. One obvious drawback to separation methods of the type utilizing water flow is that the process is sensitive to particle size; that is, the total force of the water on any given particle is a function of the area presented to the flow of water, thus tending to minimize the importance of the mass of the particle or its specific gravity.

Air flow has also been made use of in developing apparatus to concentrate minerals of a particular type out of an aggregate comprised of different materials. Basically and fundamentally, the principle of the air flow operation is similar to that of the washing process of a sluice box. Riffles, ribs, changing contours of structure, and other means are utilized to disrupt or disturb the steady flow of air, which by various means has picked up particles of the aggregate, and as the air flow is disturbed, the heaviest particles fall out into collection receptacles, and in many cases the concentrate is re-cycled to improve its grade. The very presence of recycling requirements is indicative of low efficiency. The air flow separation is subject to the same disadvantages and problems encountered in the washing processes, such as sensitivity to particle size, large, awkward apparatus, and inefficiency. In addition to these problems, the constant flow of large quantities of air create dust and dirt in an area with which it is difficult to cope.

The prior art also reveals several different species of apparatus which employ the use of intermittent blasts of low pressure air applied to a mass of aggregate on a separating screen or jig. Such systems usually utilize the shaking or vibratory action of the bed on which the aggregate rests in addition to the low pressure intermittent air which is exerted positively or negatively on the particles in a cyclic fashion. Large volumes of air are required in order to do the work on the particles and in some apparatus air tight enclosures are necessary in which the separation may be accomplished.

Several distinct disadvantages accrue to the use of this process and apparatus. The low pressure air blasts cause a sizing action of the particles to take place within the aggregate which is not conducive to proper separation. The eccentric motion of the driving apparatus creating the pressures subjects the machine to wear and limits the number of cycles per unit of time at which the machine can function. Primarily, however, the chief difficulties with this type of separation in the prior art are the inefficiencies of separation. Due to the large volumes of air being used, a substantial increase in the frequency of the air blasts results in a blowing action rather than distinct and sharply defined pressure cycles. In order that the material being processed may move from input to output, a gravity flow system is resorted to in the prior art devices, for example an inclined screen. As the particles move downwardly, a mixing with the lighter particles moving upwardly is unavoidable. In addition, the inability to maintain a constant thickness of heavy particles on the inclined bed permits spouting or geysering of the air through the bed which disrupts the aggregate and destroys the separation.

*Objects and summary of the invention*

Having briefly described some basic separators and processes which are known to the prior art, and having examined the problems and disadvantages relating thereto, it is thus the principal object of the present invention to increase the efficiency of dry mineral separation and concentration.

A further object of the invention is to separate in a level compartment, any type of material comprised of particles or units having different specific gravities.

A still further object of the invention is to exert a steeply rising pressure gradient and a sub-ambient pressure cyclic force at high frequency on a bed of material without the necessity of air tight separation chambers, sealing gates or valves.

A still further object of the invention is to stratify and separate, from an aggregate, all material of similar specific gravity by employing a shock wave of air pressure having a high pressure gradient and subsequent pressure relaxation extending below ambient pressure.

A further object of the present invention is to create a cyclicly recurring shock wave and non-symmetric pressure wave form by utilizing the symmetric high and low air pressure capabilities of one or more reciprocally moving pistons in a cylinder.

A still further object of the invention is to exert the non-symmetric pressure wave at such frequency that the agglomerate bed of material being acted upon will assume a substantially fluid state.

A still further object of the invention is to flow the aggregate material from one separating stage to another by force of gravity.

A still further object of the invention is to separate and concentrate particles with limited regard for particle size.

A still further object of the invention is to expose the aggregate material being acted upon to a complete process of separation while the material is within one separating unit, which is herein referred to as an "air cell."

A still further object of the invention is to increase productive capacity by flowing the aggregate material to be processed through a plurality of air cells.

A still further object of the invention is to simplify and improve the art of separation and concentration.

Other and still further objects, features, and advantages of the invention will be apparent from the following description read in conjunction with the accompanying drawings which are offered for purposes of explanation and illustration only and are not intended as a limitation of apparatus for carrying out the process.

Briefly, the present invention is a process for separating and concentrating particles of similar specific gravity from the aggregate of matter in which they might be found by flowing the aggregate into a level air cell in which the separation takes place; applying to the aggregate rapidly repeated cycles of pressure change, each cycle comprising a shock wave of air having high velocity and short duration followed by diminishing air pressure which falls below ambient pressure; and withdrawing the concentrate of separated material from the bottom of the bed of aggregate in the air cell.

The present invention also includes apparatus for carrying out the process of separation and concentration which comprises in combination an air cell, into which the aggregate material is placed and in which it is acted upon by repeated air pressure cycles; a pressure transducer adjacent the air cell which transforms low pressure air energy into a high velocity shock wave; sources of pressure and vacuum which connect to the air cell and pressure transducer; and means for removing the concentrate from the cell once it has been separated.

The separation of particles of different specific gravities which are found inter-mixed in an aggregate is accomplished by acting upon the aggregate within a container, hereinafter referred to as an "air cell," with repeated cycles of air pressure, whereby the particles of aggregate acting in response to the pressure change and their natural tendencies of movement, stratify themselves into layers within the aggregate, the lower layer being composed of the particles of the greatest specific gravity and the upper layers being composed of the lighter particles.

As will become obvious from the subsequent discussion and description of the process, the compressability of air is utilized, together with the property of inertia, or kinetic energy, of particles having mass to obtain stratification of the aggregate. Particles of greater specific gravity will respond differently to the forces acting upon them than will particles of small specific gravity and hence the stratification proceeds with the particles having the greatest specific gravity appearing on the bottom of the bed and the lightest on the top.

During the action of the process, the heavy bottom layer of concentrate is removed from the air cell and additional aggregate is supplied in order that the process be continuous. Moreover, the air cell units may be ganged in multiple stairstep stages connected together by a slide in order that the material being worked may be flowed by gravitational forces from one stage to another. Each succeeding stage produces concentrate of a specific gravity similar to its predecessor or of succeedingly lesser specific gravity, depending on the rate of aggregate flow established at the outset.

To more precisely and simply describe the apparatus and the process of the present invention, the remainder of the specification will be divided into the following major topics: The Air Cell will describe the unit or single stage of the apparatus in which the aggregate material is acted upon and in which the actual separation takes place; Pressure Source describes in detail the apparatus employed to furnish the requisite high pressure and subsequent negative, or sub-ambient pressure necessary to produce the precise pressure wave form which acts upon the bed of aggregate material in the air cell to accomplish the concentration; Multiple Stages describes the "ski slope" slide tray, in which are mounted a plurality of air cells, and explains the details of the mechanical feeding and withdrawal features; The Theory discusses some of the basic physical laws and their application which are fundamental in achieving the separation, and completes the description of the process of the present invention.

It is contemplated that various configurations of apparatus could be conceived for accomplishing the process of this invention, and the apparatus disclosed herein is not intended as a limitation, but only as an example of apparatus which has proven successful. Reference should be made to the appended claims of this specification for a full description of the invention.

*The air cell*

Figure 1:
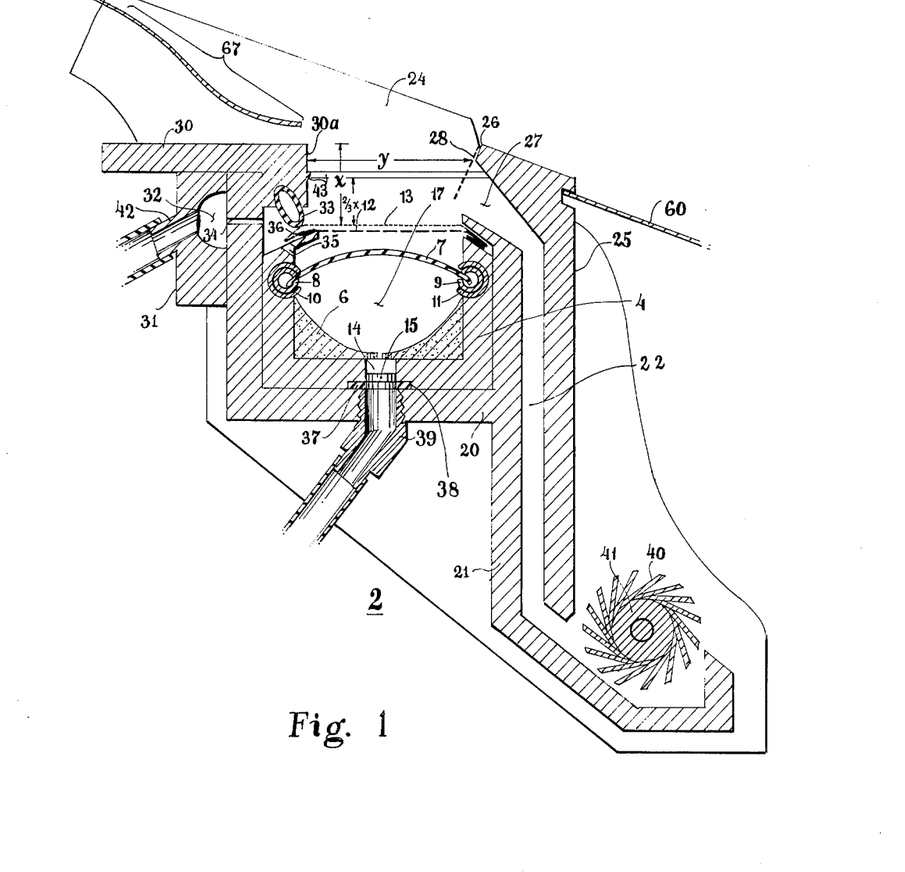
FIGURE 1 is a vertical cross-sectional view of a single air cell, showing the withdrawal chute and the conduit fastenings for applying the air pressures, together with the reflex diaphragm pump.
Figure 6:
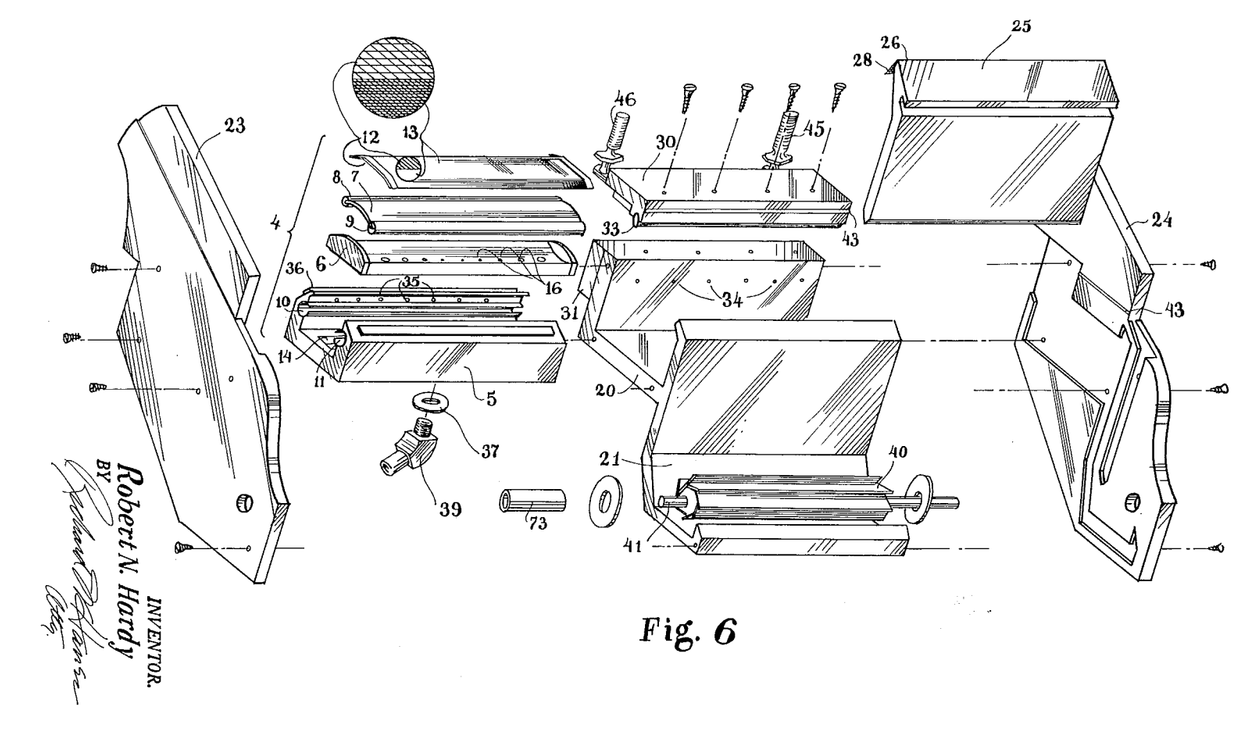
FIGURE 6 is an exploded view of a single air cell and pressure transducer.

Referring to FIGURES 1, 6 of the drawings, it is seen that the air cell of the preferred embodiment includes a bedding area for receiving the aggregate to be stratified, a porous bedding surface, an air pressure chamber below the bedding surface, and means for withdrawing a portion of the aggregate bed.

The illustrated bedding surface comprises a pair of contiguous screens 12 and 13 supported by the air pressure chamber, which preferably takes the form of a diaphragm pump 4. As will be subsequently explained, the natural reflex action of the pump diaphragm disperses a shock wave of pressure through the bedding surface to achieve the separation and stratification of the aggregate, and although this form of pressure source is preferred, other sources of steeply rising pressure fronts can be conceived which will utilize the air pressure chamber as a manifold to distribute the pressure change over the area of the bedding surface.

The diaphragm pump of the illustrated embodiment comprises a channel like frame 5 having an apertured bottom and upstanding side walls, on the top of which are mounted the bedding screens 12 and 13. The bottom screen 12 is rigid and of coarse mesh, the upper screen being on the order of 200 mesh. A natural contoured resilient diaphragm 7 provides a separation between the bottom of the frame 5 and the bedding surface and divides the pump into an activating chamber 17 and a pumping chamber, immediately over the diaphragm 7. The diaphragm is held in position by a pair of slotted clamping tubes 8 and 9 which are respectively rotatably journaled for rotation in a pair of concentric bearing tubes 10 and 11 attached to the two upstanding side members of the frame 5.

Although the reflex diaphragm pump, which is the heart of the air cell, has been referred to by that name, its function in the process of the present invention is that of a pressure transducer, that is, it is a device by means of which the energy produced in one system can be transferred to another system in a different form. Notably, the suction produced in a linearly increasing amount in the compressor is transformed, by means of the rubber diaphragm 7, to a short duration, high velocity pulse of shocked air moving vertically from the face of the diaphragm as the diaphragm returns to its normal convex shape.

A groove, 14, on the inside of the bottom of the frame 5 is common to the aperture 15, which penetrates through the bottom portion of the frame, intermediate the ends thereof. Through the hole 15 is introduced the suction or vacuum pressure, which collapses the rubber diaphragm 7. The concave filler insert 6 which covers the entire upper side of the bottom of the frame 5 is provided along its longitudinal center with a series of holes 16 which communicate with the open groove 14 in the pump frame 5. Through the holes 16 is introduced the vacuum pressure above referred to. Once during each pressure cycle sufficient vacuum pressure is introduced into the sealed activating chamber 17 of the pump to collapse the diaphragm 7. When the vacuum pressure is subsequently relieved, the diaphragm 7 reacts with a very high speed reflex action to return to its normally mounted convex position (see FIGURE 3), pushing ahead of itself a shock wave of low pressure, extremely high velocity air. The shock easily penetrates the porous screens 12 and 13, which support the bed of aggregate material and impacts on the aggregate, as will become more fully apparent as the description continues.

The shock wave to which reference is made is that wave of air propagated from the face of the diaphragm 7 of the pressure transducer as it reflexes from a deformed condition in which an abrupt, finite change has taken place in pressure and air particle velocity.

A more complete and thorough disclosure of the reflex diaphragm pump appears in my United States Patent, No. 3,124,078.

Supporting the reflex diaphragm pump 4 in the air cell assembly is a base support member 20 having a channel-shaped portion into which the pump frame 5 of the pump 4 will slide for mounting. Depending from the level of the bottom of the channel-shaped portion, as an extension of the frontal side of said channel, is slide 21 which forms a part of the withdrawal chute 22 for the concentrate. The air cell is enclosed on its two ends by side pieces 23 and 24 which are relieved to a small depth at appropriate places to seat the portions of the air cell, including the pump, fitting between the ends. The end pieces 23 and 24 act not only as the sides of the cell itself, but also as the sealing ends for the reflex diaphragm pump 4. As the cell is assembled, a sealing or calking compound of appropriate type is applied to the inside of each end piece and thus making the activating chamber of the pump 4 air tight when it is in place within the cell. Also inserted into mating grooves in the end pieces 23 and 24 is a front blade, 25 which, with the slide 21 and the end pieces, defines the withdrawal chute 22 for removal of the concentrate. To prevent the entire bed of aggregate from being forced into the mouth 27 of the withdrawal chute 22, an inclined blocking screen 28 is attached to the rear facing angular lip 26 of the front blade 25, allowing a suitable clearance between the bottom of the blocking screen 28 and the top of the supporting screen 13 for the passage of the bottom layer of concentrate from the bed above the supporting screen 13 to the mouth 27 of the withdrawal chute 22. The blocking screen 28 and the lip 26 of the front blade act as the frontal side of the container for the aggregate bed of material being acted upon. To form the rear side of the aggregate chamber, a capping plate 30 having a downwardly extending edge is secured to the top of the rear side of the channel base support member 20. The downwardly extending edge 30a forms the rearward side of the aggregate chamber and also serves to mount the air gasket tube 33. Secured to edge 30a and the side walls 23 and 24 is a triangularly shaped interference strip 43 to prevent the escape of air pressure along the chamber walls.

Secured to the back of the rear side of the channeled base support member 20 is a manifold strip 31, having a substantially semi-circular longitudinal groove 32 recessed into the side of the strip adjacent the support member 20. From the groove 32 extends a tube 42 through the back side of the strip for connection to an air source, which source will be more fully explained later in this description. Approximately on the center line of the groove 32 there are, in the back side of the support member 20, a plurality of small holes 34 for establishing communication from the groove in the manifold strip to the top convex side of the diaphragm 7 on the pump 4. Air pressure coming through the holes 34 is transmitted to the topside of the diaphragm 7, through the venting holes 35 just below the rear screen gasket 36 on the rear upstanding wall of the reflex diaphragm pump frame 5. The holes are spaced and sized for equal air pressure distribution beneath the aggregate supporting screens 12 and 13. The air gasket 33 attached to the edge of the capping plate 30 serves to seal the space existing at the front of the holes 34 in the base support member 20 so that the air pressure existing in the space will be transmitted through the holes 35 in the pump 4, to make its effect felt beneath the bed of aggregate material. To insure a tight seal between the gasket 33 and the solid bent-down edge portion of the screens 12 and 13, a washer 37 is fitted into a boss 38 on the bottom of the pump frame 5 in order that when the threaded tubing connector 39 is screwed into the cell base support member 20, its upper edge will bear against the washer 37 and raise the entire pump assembly 4 so that the air gasket 33 will acquire a tight sealing fit. If the pump is to be removed from the base support member 20, the fitting can be loosened and the pump frame slid out of its housing channel.

Adjacent the bottom end of the withdrawal chute 22 and nested in the curvature of the slide 21 is a multi-sided paddle wheel 40 axially mounted on a spindle 41 which is journaled in a pair of dimetrically disposed holes in the air cell side pieces 23 and 24. The spindle extends through the hole in one of the side pieces and has attached thereto a gear for engagement with a driving means which rotates the spindle and paddle wheel. The paddle wheel has a clockwise motion when viewed in FIGURE 1. As the concentrate is extracted and proceeds down the withdrawal chute 22, it accumulates beneath the paddle wheel and is evenly removed as the blades of the wheel bite into the accumulated concentrate, moving it in the arc of the paddle wheel and disposing of it over the front edge of the slide 21 to a receptacle below.

The removal of the heavy layer concentrate is effected during the separation process by the cyclic positive pressure which is exerted on the bed. During each cycle of pressure, the lower heavy layers of material are moved laterally across the supporting screen 13 and beneath the blocking screen 28 to the lower pressure area created in the mouth 27 of the withdrawal chute. To prevent pressure leakage from the separating chamber the chute is packed full of concentrate which is evenly removed along the entire length of the chute at its terminal end by the rotatable paddle wheel 40. As the paddle wheel 40 rotates and carries away small increments of the concentrate, the material in the chute is moved downward to the paddle wheel area by the force of gravity, leaving room in the mouth of the chute for the further extension and withdrawal of the lower strata of concentrate in the aggregate bed.

Adjustable mounting screws 45 and 46 are provided by which the air cell is secured to its mounting tray and by which the supporting screens and the entire cell are leveled after the supporting tray has been adjusted to its proper angle of repose.

Greatest efficiency is obtained in the seperating and concentrating process if the cell is tailored to the range of particle size which will be treated. As depicted in FIGURE 1 of the drawings, the aggregate chamber depth may be measured as "X" and the width of the chamber as "Y." For aggregate comprising particles of from 14 to 40 mesh the ratio of "X" to "Y" is approximately .80; for aggregate of from 30 to 80 mesh, the ratio of "X" to "Y" is approximately .5; and for very fine aggregate of from 70 to micron mesh, the ratio of "X" to "Y" is approximately .250.

Pressure source

The source of energy for development of the pressure which is applied to the bed of aggregate being acted upon can be any type of pressure or vacuum accumulator having the proper timing, valving and metering arrangements. Employed in the present embodiment is an eccentrically driven piston-type compressor with appropriate valving and metering connections to the pressure transducer.

Figure 3:
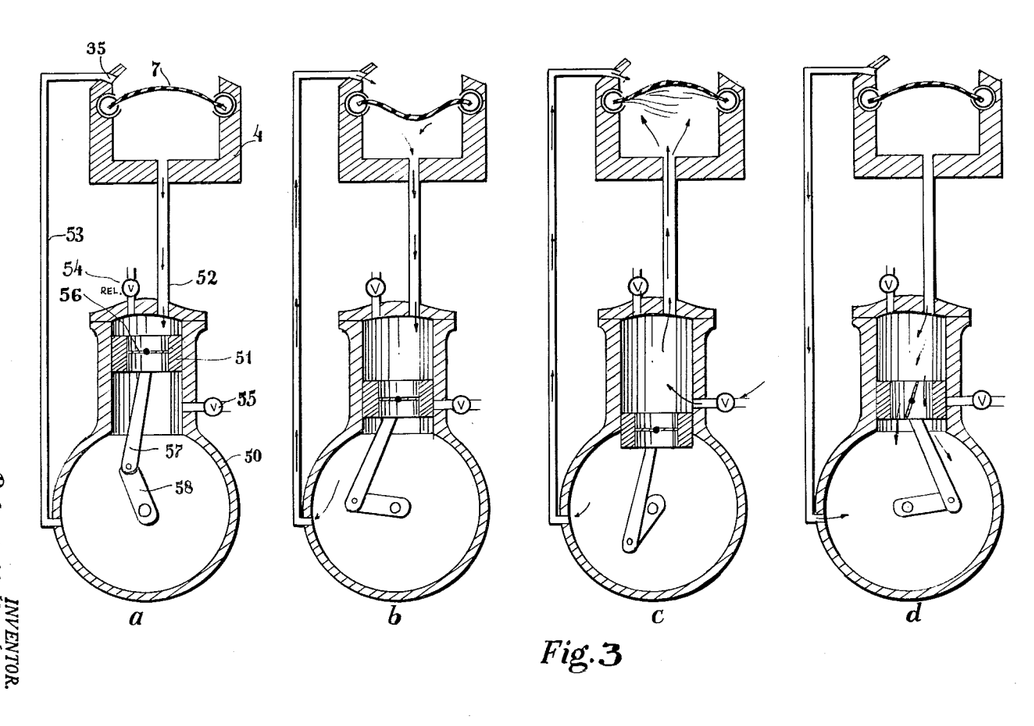
FIGURE 3 is a functional progression drawing of the pressure producing means illustrating the air flow at the various times during the pressure cycle and the position of the reflex diaphragm at different portions of the pressure cycle.

FIGURE 3 of the drawings is illustrative of a single piston compressor which has been found satisfactory for operation where large air pressure for the "assisting air" is not required. Its simplicity will serve to explain the details of the pressure source.

The pressure transducer 4 requires for its correct operation that a low pressure, or vacuum be created in the activating chamber below the diaphragm 7, and that a low positive pressure be applied at a given time during the cycle above the diaphragm 7, and further that a low pressure, or suction, be applied above the diaphragm 7 during a different portion of the cycle. In the functional diagram of FIGURE 3, the compressor 50 is indicated generally as a single cylinder, housing a piston 51 connected to a drive shaft 58 by a connecting rod 57 in a conventional arrangement well known in the art. Into the cylinder head are connected a pressure relief valve 54 and conduit tubing 52 for transporting the suction from the piston chamber to the activating chamber of the pressure transducer. Communicating with the space beneath the compressor piston is a second pressure tube 53 employed to transmit to the topside of the diaphragm of the pressure transducer the pressure which accumulates beneath the piston on its downstroke.

Nested within the piston 51 is a butterfly valve 56 which is closed during the downstroke of the piston and opens during the upstroke of the piston, allowing the air trapped within the cylinder above the piston to escape to the crankshaft case below rather than accumulating above the piston.

When the piston is at the top of the cylinder the air volume above the piston is relatively small and is at atmospheric pressure because of the relieving action of the butterfly valve 56 in the piston. During the downstroke of the piston, as shown in FIGURE 3b, the volume above the piston increases, with no addition of air except from the activating chamber of the reflex pump 4. As the piston 51 continues its downstroke and the air pressure within the activating chamber of the pump decreases, the pump diaphragm 7 collapses into the activating chamber, as shown in FIG. 3b.

Figure 4:
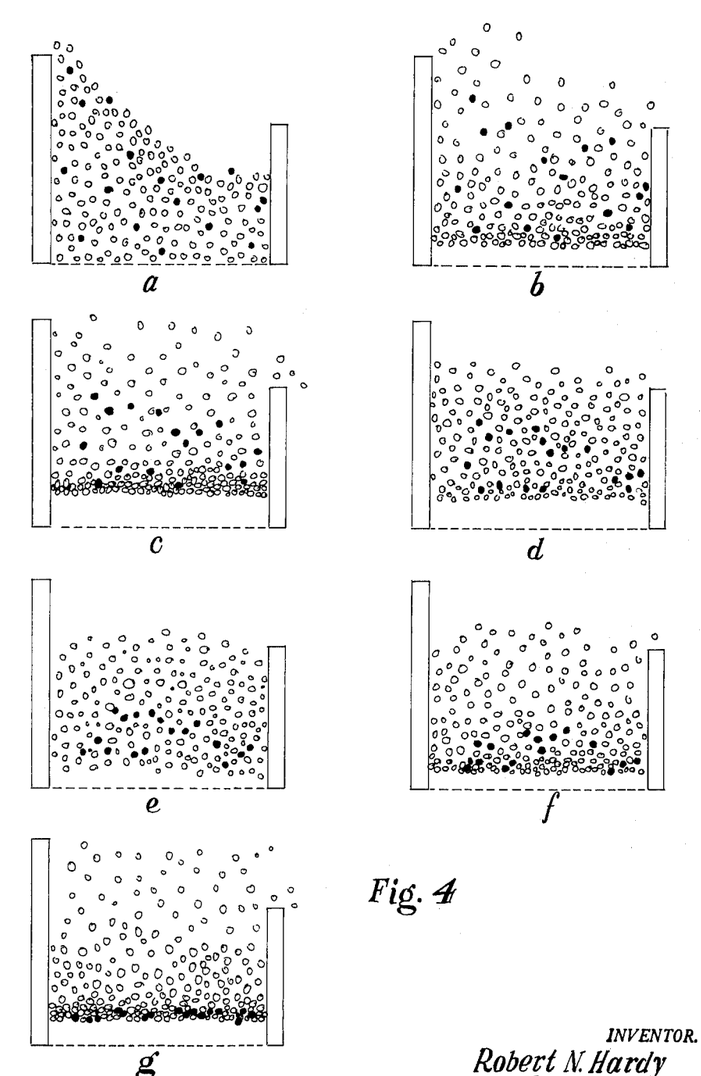
FIGURE 4 is a pictorial progression drawing of the aggregate in one air cell unit during approximately one complete cycle of the pressure change, the various illustrations being representative of the particle position at various times during the cycle.
Figure 5:
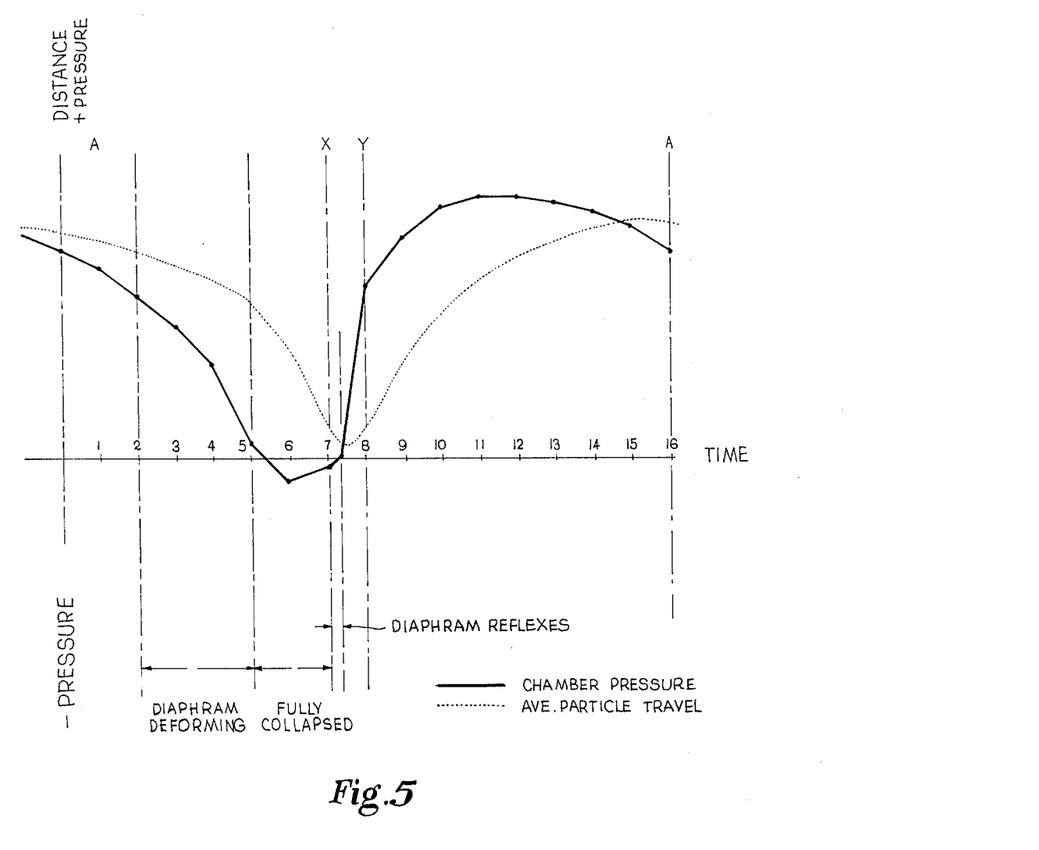
FIGURE 5 is a double graph plotted on the same set of axis, one graph illustrating the rise and fall of the air pressure as applied to the particles in the aggregate, being acted upon; the second graph showing particle movement in relation to the pressure cycle.

Communicating with the interior of the compressor cylinder is an inlet valve 55 which is disposed ⅞ of the distance of total piston travel down from the top point of piston travel. As the piston passes over the valve, the low pressure existing above the piston is immediately relieved by the inflow of air from outside the cylinder. At the point of relieving the low pressure in the pump activating chamber, the pump diaphragm 7 resumes its normally mounted position with a high speed reflex action, propagating ahead of its movement a high speed shock wave. In the graph of FIGURE 5, this shock wave appears as the steeply rising pressure gradient. The action of the aggregate particles under the force of the shock wave of the steeply rising pressure gradient is shown in FIGURES 4b and 4c. As the shock wave of compressed air is propagated into the aggregate bed, the portion of the separating chamber between the transducer diaphragm and the lower strata of particles is left at approximately ambient pressure. However, as the particles begin to free fall downward, a negative pressure, or small suction, is created below the descending particles by operation of the pressure source and by the collapse of the transducer diaphragm. To provide sufficient air volume and pressure on which the transducer diaphragm can act to produce the compressed air shock wave, the negative pressure is replaced with a small assisting air pressure, supplied through a vent 35 communicating with the space beneath the aggregate bed, just prior in time to the reflex action of the diaphragm.

For aggregate in the 14 to 40 mesh class, approximately five cubic inches of air must be supplied at a manifold pressure of approximately 1.5 pounds per square inch (at the manifold groove 32). Aggregate in the range of 30 to 80 mesh requires approximately three cubic inches of air at approximately one pound per square inch. Aggregate from 70 mesh to dust packs so tightly in the bed and is so free of leakage that only one cubic inch of air is required at a pressure of ½ pound per square inch. The foregoing figures are compatible with an air cell of six inches in aggregate chamber length and ½ inch in chamber width.

Figure 7:
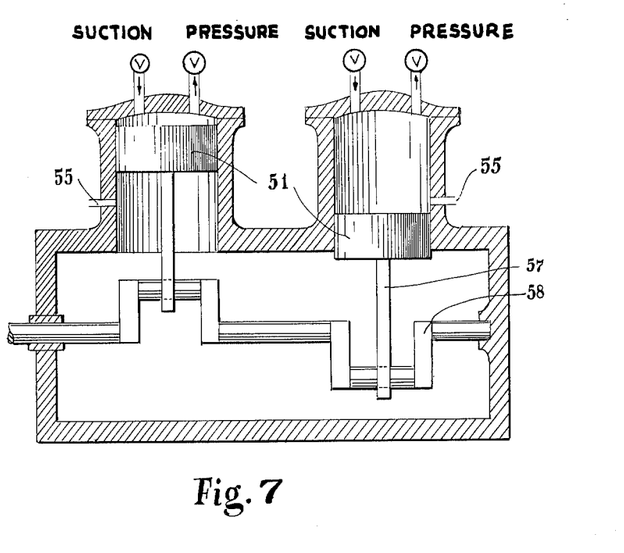
FIGURE 7 is an illustration of a two-piston compressor employed for providing necessary pressure and suction to operate one or more air cells.

The assisting, or auxiliary, air can be supplied from any pressure source which is properly timed with the piston producing the suction for collapsing the diaphragm, but in FIGURE 3 sufficient pressure is produced in the crankcase chamber to produce the necessary air for one or two cells operating at 1.5 pounds per square inch. A second, more practical embodiment of the pressure source is shown in FIGURE 7, which employs a separate piston for the production of the assisting air pressure. The latter arrangement more adequately insures sufficient pressure and quantity of air. As seen in FIGURES 3b and 3c, the assisting air pressure increases to a maximum at the moment of reflex of the diaphragm. Such timing supplies a quantity of air to be compressed by the diaphragm and a slight initial pressure beneath the aggregate to assist the shock wave with the lifting action.

At approximately point 8 in the graph of FIGURE 5, the piston 51 of FIGURE 3 begins to rise in the cylinder, creating in the crankcase chamber a low pressure which attracts the air beneath the aggregate back into the crankcase chamber, creating a suction or low pressure area beneath the aggregate particles. Such additional decrease in pressure in the chamber is shown at points 8 to 16 on the graph of FIGURE 5. During the upstroke of the piston 51, the air pressure in the space over the piston remains constant by virtue of the open butterfly valve nested within the piston. A safety relief valve is provided on the topside of the cylinder, biased to relieve the cylinder pressure if the butterfly valve fails to open and the pressure within the cylinder attains a magnitude which would endanger the diaphragm in the pump.

Figure 2:
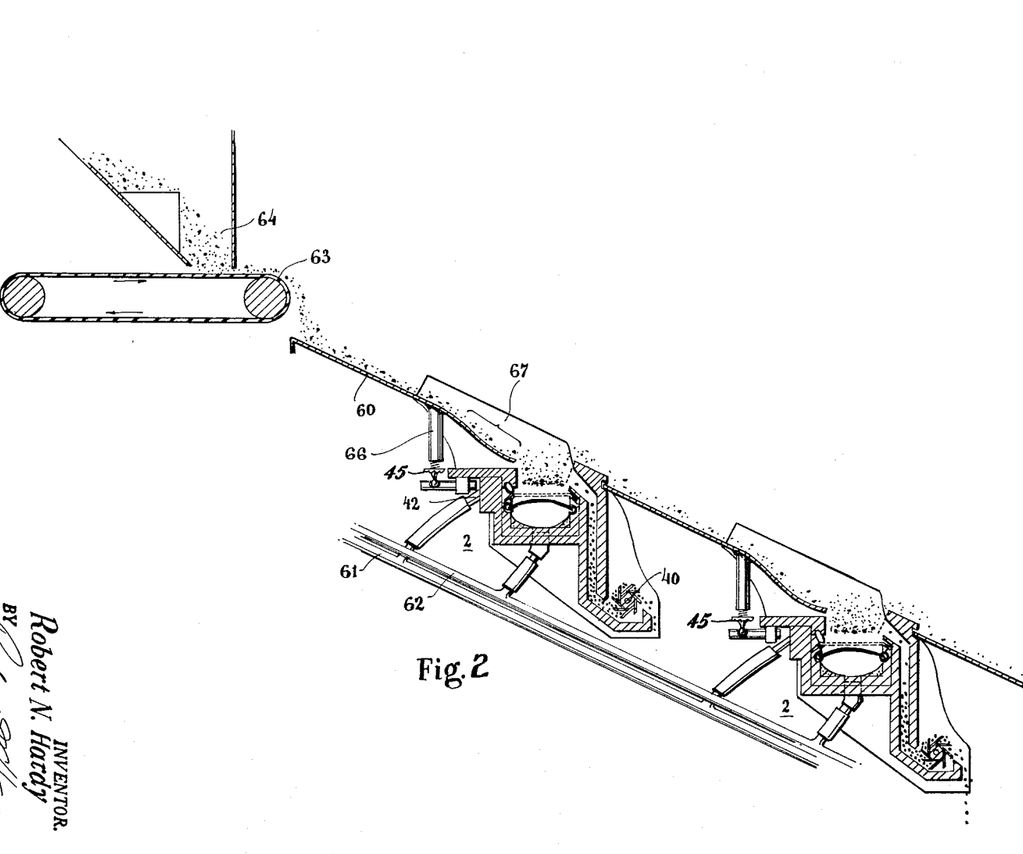
FIGURE 2 is a vertical cross-sectional view of a plurality of separating air cells installed in a "ski slope" tray mounted beneath a conveyer belt.

Shown in FIGURE 7 of the drawings is a second, more practical and efficient embodiment of the pressure source. Instead of developing the positive pressure for the auxiliary air from the large volume crankshaft chamber, the pressure is developed in a second cylinder as the piston in that cylinder is on the upstroke. Since the two pistons are moving diametrically in their phase, the pressures and suctions developed are identical in their time relations to the pressure source embodied in FIGURE 3. In the double piston configuration each cylinder is tapped and valved for a suction outlet and a pressure outlet. The suction side of one cylinder is connected to a fitting communicating with the activating chamber of one air cell pressure transducer and the positive pressure outlet of the other cylinder is directed to the assisting air manifold 31 of the same air cell. The remaining suction and pressure connections on the two cylinders are attached to a second air cell. It is feasible to operate two or more cells, depending on their size and requirements, from the same pair of pressure and suction lines by operating the lines into a pressure or suction manifold from which connections are made to individual cells. Such an arrangement is illustrated in FIGURE 2 where a pressure manifold 61 and a suction manifold 62 are shown connected to the two air cells in the drawing.

*Multiple stages*

The basic process of the present invention can be accomplished in one of the air cells, or bedding areas, as described above, however, commercial practicability requires that a plurality of units be operated simultaneously to achieve a profitable result. The fluid nature of the bed during the process creates a flowable surplus of unseparated aggregate that will easily overflow the top shoulder of the blade 25 as more aggregate is added to the bed. By guiding the overflowing aggregate into a second bedding chamber with a slide 60, the flowable condition is utilized to move the aggregate in a stairstep series to a plurality of separating units. One suggested combination of ganged separating units is seen in FIGURE 2 to include two separating cells in stairstep relation to one another, carried by an inclined single piece slide 60. To hold the flowing aggregate on the slide, a pair of side rails may be mounted along the sides of the slide. Further, the slide is provided with threaded mounting supports 66 which hold the air cells by their mounting screws 45 and 46. The tray slide 60 is flat and smooth, having a coefficient of friction which permits unimpaired gravity inspired flow of dry aggregate material. Interrupting the flat surface of the tray slide, however, is a concave "dip" 67 in the slide immediately preceeding each air cell. The concave portion of the tray slide may be referred to as the "ski slope" because of the steepness of the slope as it emerges from the flat portion of the slide and the gradual decrease in slope until a substantially level condition obtains.

As will be explained more thoroughly in the Theory section, infra, the bed of aggregate particles attains a fluid state during the operation of the process (point 14-point 3 on graph) at frequencies high enough to create efficient separation and concentration. The fluid state of the bed is a state of virtual suspension of the particles, where extremely small resistance to stirring or traversing an object through the bed is created by the aggregate. For this reason, any new material to be added to the bed must be done so as not to disrupt or stir the "floating" aggregate to an appreciable depth or the separation occurring throughout the bed will be disrupted. Hence, the new material being brought into the process is ejected from the tray slide by the momentum of its previous downward motion with a primarily horizontal component of force. Having a large horizontal component the new material tends to lay out on top of the existing bed instead of plunging down into the aggregate bed as it would do if its force component were primarily vertical. Thus, the new material is added, without disruption of the lower portion of the bed, and the lighter weight particles which have come to the top of the bed in the separation process flow out over the front side of the separating air cell and on to the succeeding stage of separation.

To maintain a smooth, constant flow of material into a separating air cell, the curvature of the "ski slope" is varied according to the range of particle size being treated. A deep curvature immediately preceding the air cell will tend to clog with fine mesh particles because of their high sliding friction and the result would be a series of small masses of material being pushed off the edge of the slide tray into the air cell, rather than the smooth flow which is desirable. Hence, for fine mesh particles the concave "ski slope" is less severe in its curvature than it is for larger mesh particles which possess less sliding friction and have increased momentum at the level portion of the "ski slope" curvature.

In view of the difference in sliding friction of aggregates of particles of different size, the tray slide is equipped with adjustable screws, or other convenient means, at each end of the tray to regulate and adjust the angle of repose of the tray slide. As much as 10 degrees of angular change may be required, depending on the size of material being processed. As an average, however, it may be stated that dry 30 mesh material will flow at an angle of approximately 30 degrees with the horizontal. To accommodate the various angles of the tray slide in which the air cells are mounted, so that the bed of aggregate will maintain a level posture, the mounting screws 45 and 46 which attach the individual air cell to the tray slide are adjustable and will rotate the cell through a small arc about its front edge, thus permitting a level adjustment of the air cell regardless of the angle of the tray slide.

Feeding the aggregate material to the tray of air cells is a rotating belt conveyor 63 having a hopper 64 disposed above it to deliver the aggregate. The speed at which the conveyor is made to deliver material to the tray governs the degree of separation achieved by each pair of air cells. A rapid flow of material results in a fast turnover of aggregate within each cell and a less complete concentration of the heavy particles at each stage of the separation. Likewise, slower feeding of new material affords each cell a greater time on which to operate and a consequent greater concentration is achieved.

Although not illustrated in the drawings, it is contemplated that a number of separating cells can be operated in one installation, affording processing for a complete range of particle sizes.

*Theory*

Referring to the graphs and the drawings it will be seen that the graph of FIGURE 5 represents two cycles of the pressure change which occurs within the separating column. Units along the ordinate represent units of pressure, the reference point of zero being atmospheric pressure. Ordinate units above the abscissa represent linear increases in pressure above atmospheric which subsequently may be referred to as "suction" or "negative pressure gradient." Units along the abscissa represent elapsed time from "time zero" at the orgin of the graph.

The dashed line of FIGURE 5 is representative of the general movement of particles in the aggregate. The ordinate of the graph represents distance of particle movement and the abscissa represents elapsed time from "time zero" at the orgin of the graph.

Analysis and description of the process of separation is facilitated by the use of the diagrams of FIGURES 4a through 4g. This series of figures represents a vertical cross-sectional view of a typical air cell separating chamber containing particles of matter of at least two different specific gravities, the solid black particles being those of the greatest specific gravity. Slightly more than one complete cycle of pressure change is illustrated by the seven figures with a pictorial showing of the particle movement to implement the graph of FIGURE 5.

FIGURE 4a shows the aggregate at rest upon the porous bottom of the separating column before the process is started. The object of the process is to concentrate all of the black particles on the bottom layer of the bed of aggregate to position them for easy lateral removal from the chamber.

To initiate the process of separation, the pump 4 or pressure transducer, applies to the bottom of the aggregate bed of material a shock wave having a steeply rising, high pressure gradient leading edge, in which an abrupt, finite change takes place in pressure and air particle velocity. The shock wave is produced in the embodiment of the apparatus of FIGURE 1 with a fast moving high reflex action pump diaphragm 7, as previously described. As the shock wave of air is applied vertically through the level porous bottom to the bed of aggregate the particles therein are forced to accelerate upward in the chamber, traveling at the front or leading edge of the shock wave. As seen in FIGURE 4b, the introduction of the shock compresses and packs the particles forming the lower portions of the aggregate bed, which packing tends to form a seal over the upward traveling shock wave. As the particles of aggregate and the shock wave continue their upward movement, the compression of the aggregate increases and the space beneath the aggregate enlarges as is more clearly shown in FIGURE 4c. Because of the law well known to physics that pressure is a function of volume in an enclosure, the pressurized air beneath the aggregate can expand in the ever increasing space, and consequently the pressure diminishes as the particles are carried upward by the momentum of their original motion. In addition to the aforesaid expansion of the pressure wave, it is obvious that the seal formed by the tightly packed particles of the lower bed is not absolute and some "leakage" or expansion of the shock wave takes place up through the aggregate bed. This slight upward extension of the pressure wave carries with it some of the lighter specific gravity particles and results in an aeration of the aggregate toward the higher levels of the column where the aggregate is less tightly packed. The upward expansion of the shock wave is to be distinguished from a blowing action due to its very short duration and very small volume of air.

As seen in FIGURE 4d, the very light particles have been forced to the top of the bed and are eligible to be removed from the stage. At the point in time of the cycle represented by FIGURE 4d the aggregate bed has reached what is referred to as the "point of equilibrium." The force exerted on the bed by the dissipating shock wave is equal to that force represented by the weight of the mass of the particles in the chamber. Having dissipated its lifting force, the shock wave pressure is no longer able to maintain suspension of the particles and the greater force of gravity accelerates the particles in free fall toward the bottom of the chamber.

As the elevated particles begin to accelerate downwardly, as shown in FIGURE 4e, in free fall after the influence of the shock wave has disappeared, each and every particle comprising the aggregate acquires an increasing amount of kinetic energy or moving inertia, the kinetic energy attained by each particle being a function of its mass or specific gravity; the heavier particles attain a greater kinetic energy for a given velocity of free fall than the lighter particles.

Prior to the time that the particles reach the bottom of the separating chamber and come to rest, a second shock wave is introduced into the chamber through its porous supporting screens 12 and 13. The compressed air of the succeeding shock wave being more dense than the existing air in the column, the advancing wave front resists and restrains the further fall of the particles and once again tends to accelerate the particles in an upward direction as shown in FIGURES 4f and 4g. It is at this point in the cycle that substantial separation of particles takes place. Having accumulated a greater kinetic energy or inertia of motion in their free fall, the heavier particles penetrate deeper into the compressed air of the ascending shock wave than do the lighter particles which possess less specific gravity and kinetic energy; that is, the heavier particles travel further toward the bottom of the container before they are reversed in their direction of travel than do the lighter particles. As the succeeding shock wave travels upwardly into the separating chamber, it will be seen that due to the various degrees of penetration of the wave front by particles of different specific gravities, the aggregate has commenced to separate, the heaviest particles of the bed making the greatest progress toward the bottom of the chamber and the next heaviest particles making the next greatest progress and the lightest particles making the least progress toward the bottom. As successive shock waves encounter the free falling particles of the aggregate, the heavier particles make increasing progress toward the bottom because of the fact that with each succeeding cycle the heavier particles are accelerated upward from a lower position in the bed. The net result of the continued shocking of the aggregate bed is to cause a migration of the heavier particles to the bottom of the bed of material and a resultant stratification of the bed as a function of particle specific gravity, with the particles of greatest specific gravity forming the lower strata.

After the completion of a very few cycles of pressure changes within the column, many of the heavier particles constituting the aggregate will have reached the bottom strata, thus forming a layer of heavy particles. As the process continues and the bottom layer increases in depth and density as more particles are added to it, the layer assumes the roll of a valve, similar to the so-called "seal" referred to in connection with FIGURE 4a, but more effective. Due to the fact that the bottom layer is composed of the dense, heavier particles, it tends to regulate and maintain the air density and steep pressure gradient of the shock wave by the force and packing action of the particles in the valving layer as they plunge into the front of the ascending shock wave in their free fall portion of the particle movement cycle.

As the dense valving layer is built up at the bottom of the bed, the particles in the upper layers of the bed collide with the dense bottom layer due to the fact that the dense layer at the bottom is shocked into an upward acceleration sooner than those particles nearer the top, resulting in a collision between the upward accelerating bottom layer and the still free falling top layer particles. The ease of penetration of the shock wave front and the dense bottom layer by particles of the upper levels in the bed is in direct proportion to the specific gravity or mass of the individual particles and inversely proportional to their cross sectional area in the plane of the wave front. Therefore, particles of low specific gravity accomplish a penetration of the bottom layer and reach the trailing edge of the pressure wave later in time and at a higher level in the particle separating column than do particles of higher specific gravity which entered the leading edge of the wave front at the same time. The same is true of the particles which actually collide with the dense valving layer of particles. The vertical density gradient of the valving layer, as well as the average specific gravity of the particles which compose it, becomes progressively less as it approaches the upper portion of the chamber. The rapid expansion of the air in the shock wave as it reaches the upper extremities of the chamber serves to keep the surface of the aggregate bed in an extremely fluid state.

It will be apparent to those skilled in the art that the valving action of the dense bottom layer of the bed holds the air leakage through the separating chamber to a minimum, and in turn maintains particle movement, relative to the air around the particle, to a minimum since the motion of the particles in their upward travel in an abrupt motion or transient motion which is characterized by suddenness and by significant displacement.

Thus far the explanation of the separation process has concerned itself with the vertical rise and fall of the particles and how the free fall of the particles, when encountered by the next shock wave and the accelerating bottom layer of particles results in a separation of particles into layers or strata depending on the penetration potential of any individual particle. Because the desired separation occurs largely during the free fall of the particles and their respective penetrations into the wave front and the valving layer, it is a further feature of process of the present invention to eliminate from the free fall portion of the cycle any influence that air resistance might exert on the free falling particles. In order that the kinetic energy attained by the particles in their free fall may be solely a function of their mass, it is necessary to reduce or eliminate any variables which might be introduced by changes in particle velocity due to air resistance.

As will be seen by comparing the graphs of FIGURE 5, a small negative pressure gradient or "suction" is introduced through the pump frame holes 34 into the separating chamber at the precise moment of time that the particles begin their free fall. The slope of the applied negative pressure gradient curve is shaped such that the air pressure within the chamber will be so reduced so as to imitate the curve of acceleration due to gravity. Such a reduction in air pressure within the column causes the air particles therein to move downwardly with the same velocity and acceleration as the mineral particles and thus no relative movement exists between the air and mineral particles. The absence of friction between the particles and air provides a true free fall velocity in which particle size or exposure area play no part, thus the separation of the particles in the bed as a function of their specific gravities or masses is not limited to particles of the same size or similar shape, but in fact has limited regard for such features.

In some instances where the particles being separated are extremely small in size and mass, the slope of the negative pressure gradient curve may be steepened by introducing a greater "suction" so as to accelerate the particles to a greater velocity than they would otherwise be accelerated by the normal force of gravity. Such an increase in particle velocity during the fall portion of the cycle serves to increase the kinetic energy and penetration potential of the particles of greater specific gravity and a more effective separation is achieved.

In addition to the aforementioned negative pressure supplied to the separating chamber, as shown in that portion of the pressure graph of FIGURE 5 which is below the abscissa, the pressure source is employed to furnish assisting air in small positive pressures which valves, supplements and aids the shock wave pressure supplied by the pressure transducer. For very small size particle aggregates the air pressure is proportionally reduced and when larger particles, requiring greater volumes of air and greater shock pressures, are worked the assisting air pressure source supplies a higher air pressure at the onset of the diaphragm collapse to avoid the influx of air down through the bed as previously explained in the section concerning the pressure source.

In the process of the present invention, as more raw material is processed, the layer of heavy minerals at the bottom of the bed increases in depth to the point where the incoming shock wave has just sufficient pressure and velocity to accelerate the entire bed. To perpetuate the process and maintain the efficiency of operation, a removal of the bottom layer material is necessary.

The withdrawal of heavy particles from the bottom of the aggregate bed takes place when new material is being added to the top of the particle chamber as previously explained in the section describing the tray slide. As the lower strata of heavy particles increases in thickness, the shock wave of air pressure applied to the bottom of the aggregate bed tends to force the bottom material into the closest available unoccupied space. The mouth 27 of the withdrawal chute 22 represents such a space. The blocking screen 28 prevents a mass exit of the heavy particles and the mixed particles which have not yet worked to the bottom of the bed. The small space beneath the blocking screen permits the withdrawal of a given quantity of heavy particles with each application to the bed of the high velocity shock wave. The withdrawal chute is maintained full of concentrate to prevent a leakage of the applied pressure, proportion to the feed rate.

The frequency at which the pressure wave form is applied to the aggregate bed is a function of the particles size being processed. A desirable frequency range is approximately 375 cycles per minute for large particles of approximately 4 to 20 mesh size; 475 cycles per minute for particles of 20 to 60 mesh size; 550 cycles per minute for particles of 80 to 160 mesh size; and approximately 600 cycles per minute for particles of 200 to 400 mesh size.

I claim:

1. A dry concentrator for separating particles in a solids bed according to their specific gravity comprising in combination;
    a fixed substantially level pervious floor member below said solids bed;
    enclosure means depending from the sides and ends of said floor member to form a plenum;
    transducer means having an air supply and a movable vane in communication with the said plenum;
    energy input means coupled to the transducer for actuating the movable vane cyclicly to impact and compress the air into a series of sharp pulses;
    means interconnecting the transducer and the plenum for directing said pulses into the bottom of the solids bed, whereby the bed is lifted by each of said pulses;
    wherein said energy input means further includes, timing means to regulate the occurrence of each pulse to be during the free fall descent of the particles of the solids bed from the effect of the preceding pulse;
    a generally inclined slide of substantially the same width as the floor member and positioned with its lower end above one side margin of the said floor member; and
    blade means disposed above the opposite side margin of the floor member and parallel therewith, which blade means defines the upper portion of a transverse concentrate withdrawal port.

2. The process of separating particles of different specific gravities, comprising;
    forming a continuous generally inclined flow of particulate mixture of substantially uniform width;
    establishing in said flow at least one zone of separation transverse to the direction of flow;
    alternately compacting and expanding the depth of mixture flow within the separation zone by applying to the bottom of the mixture an upwardly directed gaseous pressure pulse having a high pressure gradient wave front of short time duration which lifts and momentarily suspends the mixture particles,
    cyclicly and repetitively applying similar upwardly directed pressure pulses to the bottom of the zone during the time in which the particles are falling from the effect of the previous pulse; and splitting off the lower portion of the mixture flow on the downstream side of the separation zone.

3. Process for the stratification of a mixture of materials of different specific gravities which comprises;
establishing a bed of said materials;
subjecting the bed to a short duration pulse of high pressure and substantially longer duration of low air pressure alternately and repetitively applied uniformly over the whole bottom surface area of the bed;
compacting and lifting the bed with each application of high air pressure;
dropping and expanding the bed with each application of low air pressure, wherein the pulse of high pressure is applied to the bed during the dropping and expansion of the bed so as to maintain the bed in a state of suspension; and
withdrawing the higher specific gravity materials from the bottom of the bed.

4. The process of claim 3 and further including;
withdrawing the greater specific gravity particles from the bottom portion of the said flow in a downwardly descending stream emerging from the said flow on a transverse line across the full width thereof at the lower margin of the said stratifying zone.

5. A process for the stratification and separation of the particles of an aggregate according to the specific gravity thereof which comprises the steps of;
forming a solids bed of the aggregate;
directing a high velocity wave of compressed air against the underside of the solids bed whereby the said bed will be lifted upwardly and will free fall downwardly subsequent to the application of said compressed air;
re-directing in cyclic fashion additional waves of compressed air against the underside of the solids bed at a point of time during the said free fall of the particles in the bed, whereby the aggregate bed is suspended;
wherein the time duration of the compressed air wave is short with respect to the time duration of the said cycle of compressed air applications; and
recovering a lower portion of the aggregate bed.

6. A process for the stratification and separation of the particles of an aggregate according to the specific gravity thereof which comprises the steps of;
forming a solids bed of the particulate aggregate;
suspending the solids bed by,
applying to the bottom of the bed an upwardly directed gaseous pressure pulse having a high pressure gradient wave front of short time duration which lifts and momentarily suspends the aggregate particles,
cyclicly and repetitively applying similar upwardly directed pressure pulses to the bottom of the bed during the time in which the particles are falling from the effect of the previous pulse; and
recovering a lower portion of the aggregate bed.

7. A method of stratifying aggregate having particles of different specific gravities comprising the steps of;
bedding the aggregate mixture in an open separating chamber;
inducing beneath said aggregate bed cyclicly varying air pressure, each of said pressure cycles including,
a period of quick air pressure increase where the air pressure rise time is of short duration with respect to the time duration of each cycle,
a period of pressure decay substantially greater in time duration than the pressure rise time;
wherein the said induction of cyclic air pressure further comprises,
directing the said air into the bottom of the aggregate bed during the period of pressure increase whereby the particles are accelerated upwardly and then free fall downwardly subsequent to the pressure rise, and
repeating the cycle with such frequency that the increased pressure is directed against the aggregate bed during the free fall of the particles; and
withdrawing a lower portion of the aggregate bed.

8. The steps of claim 7 wherein the period of pressure decay includes the application of sub-atmospheric pressure during the free fall of the particles and immediately preceding the application of the next quick pressure increase.

9. Air operated apparatus for stratification and concentration of a mixture of particulate materials of different specific gravities, comprising in combination;
a pressure transducer;
a superimposed stratifying compartment in which the mixture is bedded;
the pressure transducer including,
means communicating with the stratifying compartment for generating and propagating upwardly into said compartment recurring asymmetric cycles of alternate high and low air pressure waves of such magnitude that the high pressure wave lifts the said bedded mixture; and
means operatively connected to the said generating means for regulating the frequency of said pressure cycles wherein the high pressure wave is propagated during the free fall of the mixture from the effect of the previous cycle.

10. Apparatus for separating particles of different specific gravities which are found inter-mixed in an aggregate, comprising in combination;
an aggregate holding chamber having a permeable bottom;
generating means disposed beneath said permeable bottom for generating a cyclic series of compressed air waves having steeply inclined leading edges and being of short time duration with respect to the time duration of each of said cycles;
means operatively connected to said generating means for directing at high velocity said compressed air waves into the bottom of the holding chamber so as to cyclicly lift a bed of aggregate contained therein; and
timing means operatively connected to the generating means, said timing means regulating the frequency of application of said compressed air waves so that each is propagated into the bottom of the aggregate in the chamber during the free fall descent of the aggregate from the effect of the previous compressed air wave.

11. A stratifying and separating device comprising;
an inclined impervious slide having a plurality of transverse openings spaced therealong;
means for feeding material to the upper end of said slide;
a plurality of separating chambers respectively disposed beneath each of said plurality of transverse openings in said slide, said separating chambers including,
generating means disposed beneath said permeable bottom for generating a cyclic series of compressed air waves having steeply inclined leading edges and being of short time duration with respect to the time duration of each of said cycles;
means operatively connected to said generating means for directing at high velocity said compressed air waves into the bottom of the holding chamber so as to cyclicly lift a bed of aggregate contained therein; and
timing means operatively connected to the generating means, said timing means regulating the frequency of application of said compressed air waves so that each is propagated into the bottom of the aggregate in the chamber during the free fall descent of the aggregate from the effect of the previous compressed air wave.

References Cited by the Examiner

UNITED STATES PATENTS

| | | | |
|---|---|---|---|
| 112,918 | 3/1871 | Hooper | 209—475 |
| 236,730 | 1/1881 | Stephens | 209—475 |
| 1,794,824 | 3/1931 | Bendelari | 209—455 |
| 2,052,431 | 8/1936 | Wade | 209—455 |
| 2,079,858 | 5/1937 | Horton | 103—151 |
| 2,241,842 | 5/1941 | Brusset | 209—468 |
| 2,273,296 | 2/1942 | Stump | 209—475 |
| 2,752,041 | 6/1956 | Clint | 209—475 |
| 2,847,125 | 8/1958 | Belliard | 209—455 |
| 2,853,192 | 9/1958 | Berry | 209—469 |

FRANK W. LUTTER, *Primary Examiner.*

HARRY B. THORNTON, HERBERT L. MARTIN, EDWARD J. MICHAEL, *Examiners.*

H. F. PEPPER, *Assistant Examiner.*